(12) United States Patent
Tolba

(10) Patent No.: US 8,312,212 B2
(45) Date of Patent: Nov. 13, 2012

(54) SYSTEMS AND METHODS FOR ATTACHING A VIRTUAL MACHINE VIRTUAL HARD DISK TO A HOST MACHINE

(75) Inventor: Ahmed M. Tolba, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 12/471,788

(22) Filed: May 26, 2009

(65) Prior Publication Data

US 2009/0235358 A1  Sep. 17, 2009

Related U.S. Application Data

(63) Continuation of application No. 11/008,832, filed on Dec. 10, 2004, now Pat. No. 7,555,596.

(51) Int. Cl.
*G06F 12/00* (2006.01)
(52) U.S. Cl. .............. 711/112; 711/6; 711/154
(58) Field of Classification Search .......... None
See application file for complete search history.

(56) References Cited

U.S. PATENT DOCUMENTS

| 6,075,938 | A | 6/2000 | Bugnion et al. |
| 6,535,891 | B1 * | 3/2003 | Fisher et al. ............ 707/203 |
| 7,409,719 | B2 * | 8/2008 | Armstrong et al. ......... 726/24 |
| 2006/0020779 | A1 | 1/2006 | Rothman et al. |
| 2006/0085784 | A1 | 4/2006 | Traut et al. |
| 2007/0055703 | A1 * | 3/2007 | Zimran et al. ............. 707/200 |

* cited by examiner

*Primary Examiner* — Than Nguyen
(74) *Attorney, Agent, or Firm* — Woodcock Washburn LLP

(57) ABSTRACT

Various embodiments of the present invention are directed to systems and methods for "attaching" a virtual hard drive to the physical computer hardware by implementing a specialized disk controller driver for the host operating system that is recognized by the host operating system as a disk controller driver but which in fact also emulates the virtual hard disk it is "attached" to. When the host operating system sends requests to read and write sectors from the virtual hard drive, the specialized driver (the "virtual hard drive controller driver") directly accesses and manipulates the back-end file mentioned above. Thus the virtual disk is "attached" and recognizable by the host operating system and can be manipulated thereby (and applications executing thereon).

19 Claims, 6 Drawing Sheets

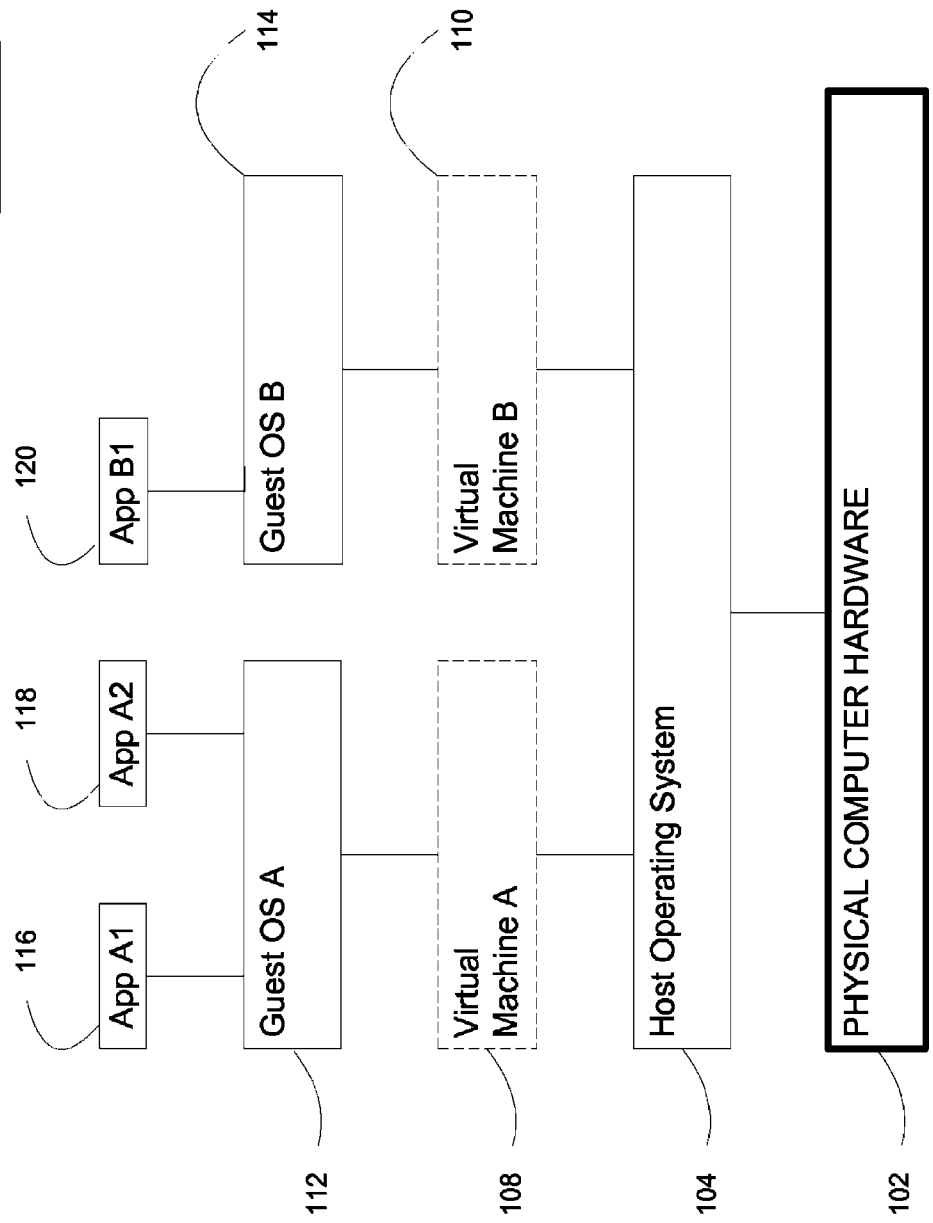

SYSTEMS AND METHODS FOR ATTACHING A VIRTUAL MACHINE VIRTUAL HARD DISK TO A HOST MACHINE

CROSS-REFERENCE TO RELATED APPLICATIONS

This application is a continuation of U.S. patent application Ser. No. 11/008,832, filed on Dec. 10, 2004 and entitled "SYSTEMS AND METHODS FOR ATTACHING A VIRTUAL MACHINE VIRTUAL HARD DISK TO A HOST MACHINE," the entirety of which is hereby incorporated by reference herein, and which is related by subject matter to the inventions disclosed in the following commonly assigned application: U.S. patent application Ser. No. 10/435,481, filed on May 8, 2003 and entitled "SYSTEM AND METHOD FOR TESTING, SIMULATING, AND CONTROLLING COMPUTER SOFTWARE AND HARDWARE," the entirety of which is hereby incorporated by reference herein.

FIELD OF THE INVENTION

The present invention generally relates to the field virtual machines (also known as "processor virtualization") and software that executes in a virtual machine environment. More specifically, the present invention is directed to systems and methods for attaching a virtual hard drive (VHD) for a virtual machine (VM) emulated on a host computer system (HOS) directly to said HOS.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a "virtual machine" as the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulated environment might be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). In this configuration a host operating system (HOS) and a VMM may run side-by-side on the same physical hardware. Alternately, the emulator program may be the host operating system itself running directly on the physical computer hardware and emulating another hardware configuration. In a specific implementation of this embodiment, the host operating system software may specifically comprise a "hypervisor."

A hypervisor is a control program that exists near the kernel level of a host operating system and operates to allow one or more secondary operating systems, other than the host operating system, to use the hardware of the computer system, including the processor of the computer system. A hypervisor emulates the operating environment of the secondary operating system so that the secondary operating system believes that it is operating in its customary hardware and/or operating system environment and that it is in logical control of the computer system, when it may in fact be operating in another hardware and/or operating system environment and the host operating system may be in logical control of the computer system. Many operating systems function such that the operating system must operate as though it is in exclusive logical control of the hardware of the computer system. For multiple operating systems to function simultaneously on a single computer system, the hypervisor of each operating system must function to mask the presence of the other operating systems such that each operating system functions as though it has exclusive control over the entire computer system.

As well-known and readily-appreciated by those of skill in the art, a virtual machine can expose one or more virtual disks to a guest operating system where data written to a virtual disk is actually stored and retrieved on demand in a back-end file on the real hard drive of the host computer system. It is also well-known and readily-appreciated by those of skill in the art that virtual disks are not accessible to the host operating system without running the guest operating system inside the virtual machine.

SUMMARY OF THE INVENTION

Various embodiments of the present invention are directed to systems and methods for "attaching" a virtual hard drive to the physical computer hardware. For several embodiments of the present invention, this is achieved by implementing a specialized disk controller driver for the host operating system that is recognized by the host operating system as a disk controller driver but which in fact also emulates the virtual hard disk it is "attached" to. When the host operating system sends requests to read and write sectors from the virtual hard drive, the specialized driver (the "virtual hard drive controller driver") directly accesses and manipulates the back-end file mentioned above. Thus the virtual disk is "attached" and recognizable by the host operating system and can be manipulated thereby (and applications executing thereon).

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3A illustrates a virtualized computing system wherein the emulation is performed by the host operating system (either directly or via a hypervisor);

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
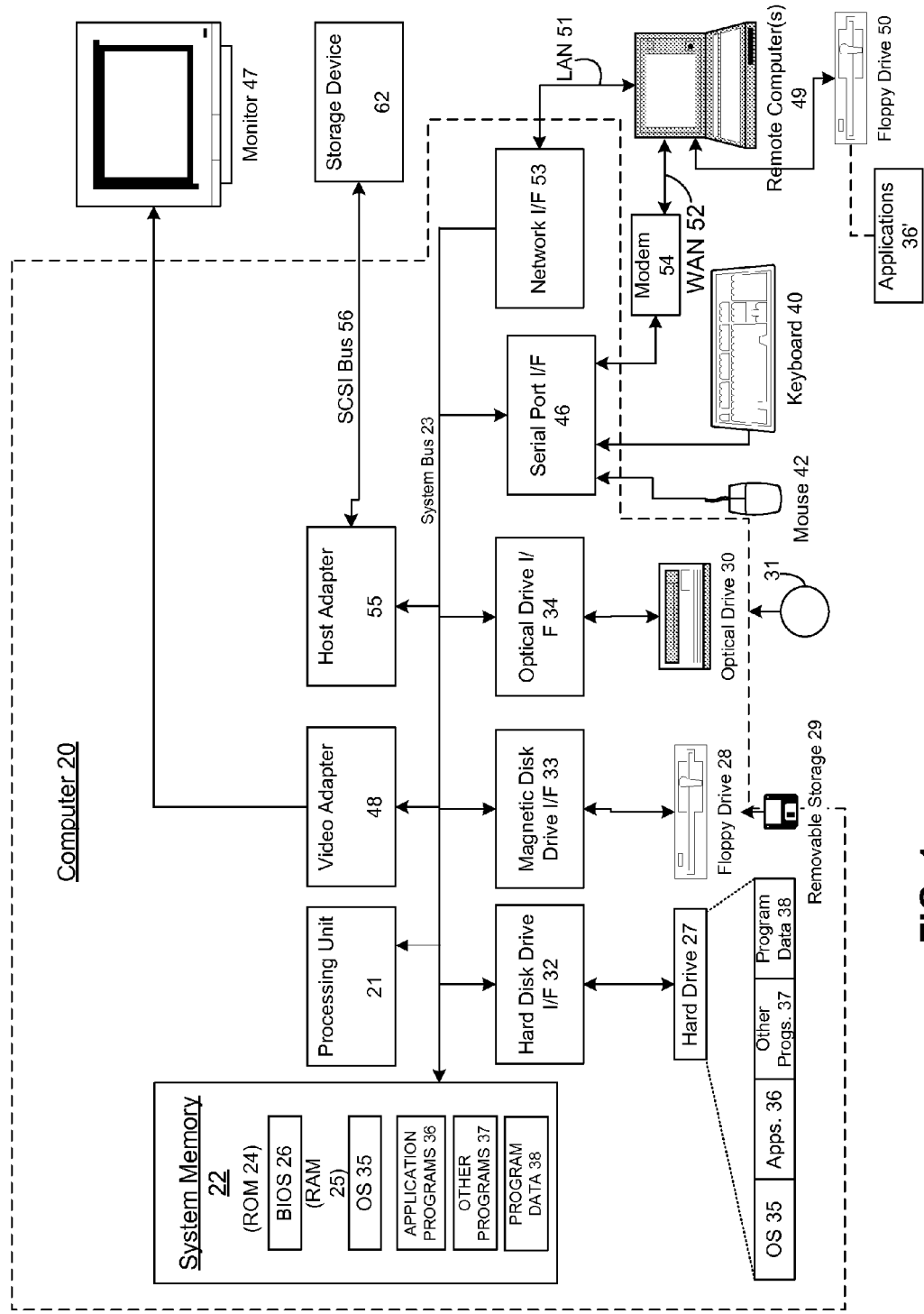
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
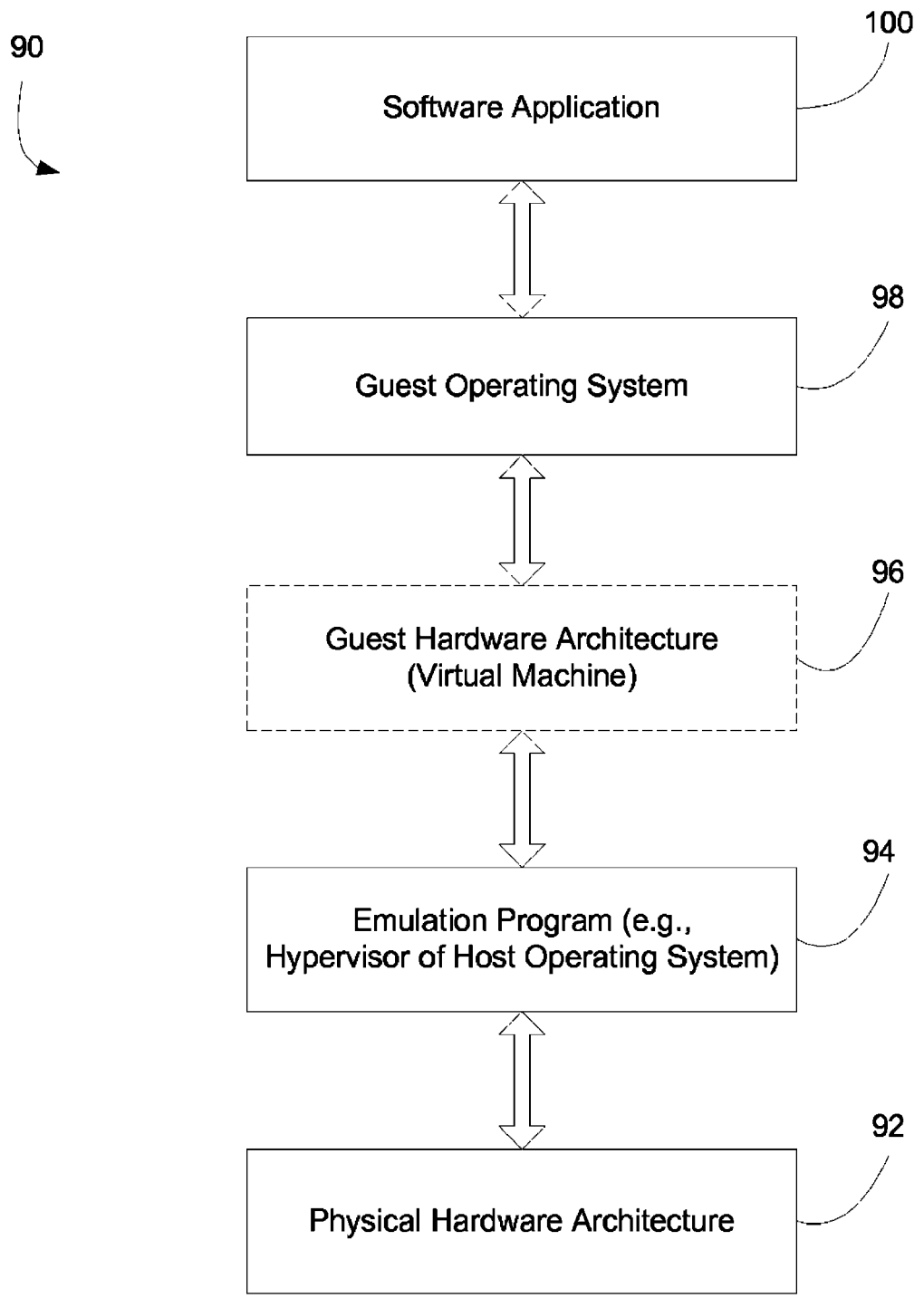
FIG. 2 illustrates the logical layering of the hardware and software architecture for an emulated operating environment in a computer system.

FIG. 2 is a diagram representing the logical layering of the hardware and software architecture for an emulated operating environment in a computer system. In the figure, an emulation program 94 runs directly or indirectly on the physical hardware architecture 92. Emulation program 94 may be (a) a virtual machine monitor that runs alongside a host operating system, (b) a specialized host operating system having native emulation capabilities, or (c) a host operating system with a hypervisor component wherein said hypervisor component performs said emulation. Emulation program 94 emulates a guest hardware architecture 96 (shown as a broken line to illustrate the fact that this component is the "virtual machine," that is, hardware that does not actually exist but is instead emulated by said emulation program 94). A guest operating system 98 executing on said guest hardware architecture 96, and software application 100 runs on the guest operating system 98. In the emulated operating environment of FIG. 2—and because of the operation of emulation program 94—software application 100 can run in computer system 90 even though software application 100 is designed to run on an operating system that is generally incompatible with the host operating system and hardware architecture 92.

FIG. 3A illustrates a virtualized computing system comprising a host operating system software layer 104 running directly above physical computer hardware 102 where the host operating system (host OS) 104 provides access to the resources of the physical computer hardware 102 by exposing interfaces that are the same as the hardware the host OS is emulating (or "virtualizing")—which, in turn, enables the host OS to go unnoticed by operating system layers running above it. To perform the emulation, the host operating system 102 may be a specially designed operating system with native emulations capabilities or, alternately, it may be a standard operating system with an incorporated hypervisor component for performing the emulation.

Referring again to FIG. 3A, above the host OS 104 are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest operating systems (guest OSs) A 112 and B 114 respectively. Running above guest OS A 112 are two applications, application A1 116 and application A2 118, and running above guest OS B 114 is application B1 120.

In regard to FIG. 3A, it is important to note that VM A 108 and VM B 110 (which are shown in broken lines) are virtualized computer hardware representations that exist only as software constructions and which are made possible due to the presence of specialized software code that not only presents VM A 108 and VM B 110 to Guest OS A 112 and Guest OS B 114 respectively, but which also performs all of the software steps necessary for Guest OS A 112 and Guest OS B 114 to indirectly interact with the real physical computer hardware 102.

Figure 3B:
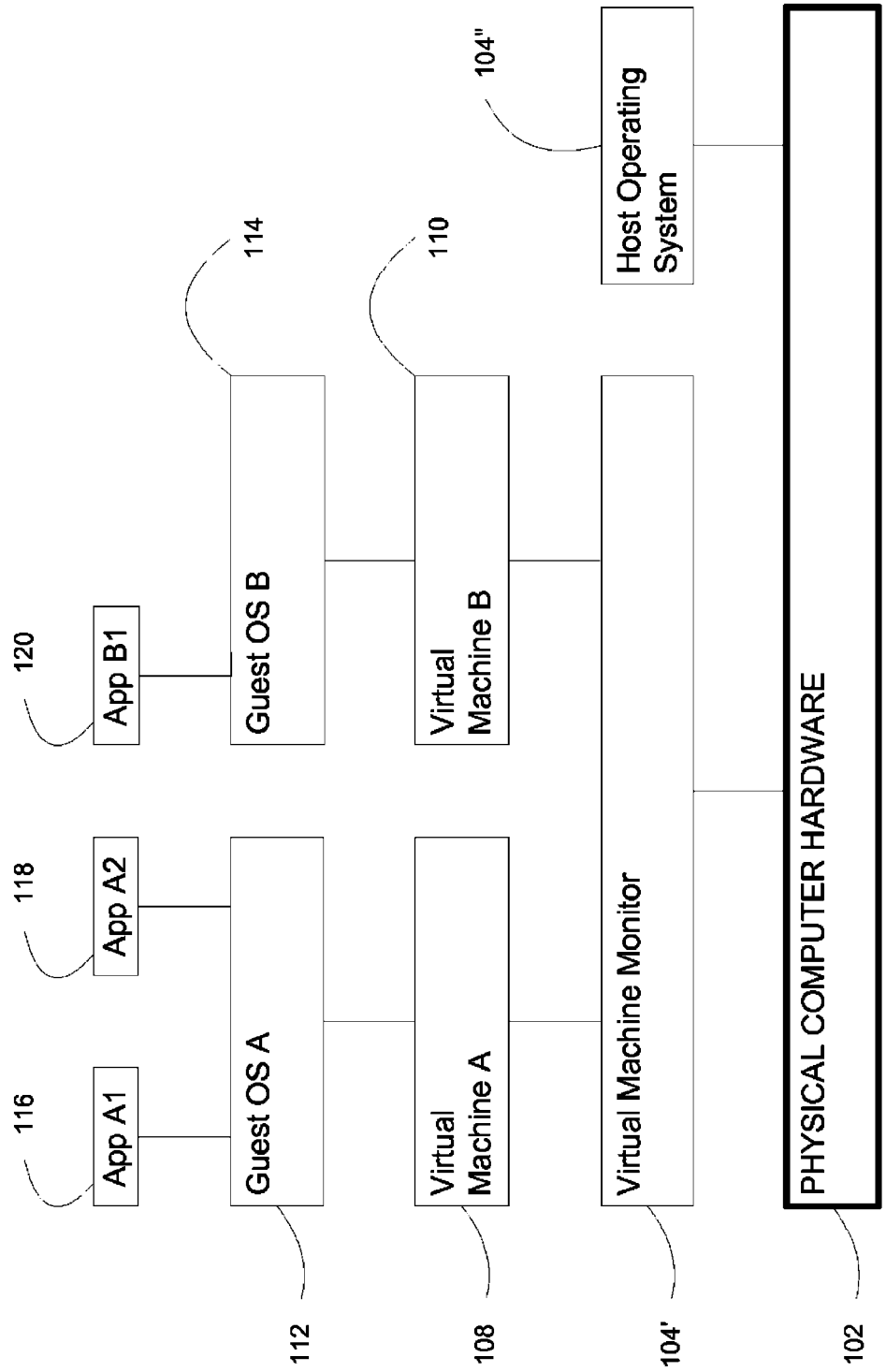
FIG. 3B illustrates an alternative virtualized computing system wherein the emulation is performed by a virtual machine monitor running side-by-side with a host operating system.

FIG. 3B illustrates an alternative virtualized computing system wherein the emulation is performed by a virtual machine monitor (VMM) 104' running alongside the host operating system 104". For certain embodiments the VMM may be an application running above the host operating system 104 and interacting with the computer hardware only through said host operating system 104. In other embodiments, and as shown in FIG. 3B, the VMM may instead comprise a partially independent software system that on some levels interacts indirectly with the computer hardware 102 via the host operating system 104 but on other levels the VMM interacts directly with the computer hardware 102 (similar to the way the host operating system interacts directly with the computer hardware). And in yet other embodiments, the VMM may comprise a fully independent software system that on all levels interacts directly with the computer hardware 102 (similar to the way the host operating system interacts directly with the computer hardware) without utilizing the host operating system 104 (although still interacting with said host operating system 104 insofar as coordinating use of said computer hardware 102 and avoiding conflicts and the like).

All of these variations for implementing the VMM are anticipated to form alternative embodiments of the present invention as described herein, and nothing herein should be interpreted as limiting the invention to any particular VMM configuration. In addition, any reference to interaction between applications 116, 118, and 120 via VM A 108 and/or VM B 110 respectively (presumably in a hardware emulation scenario) should be interpreted to be in fact an interaction between the applications 116, 118, and 120 and a VMM. Likewise, any reference to interaction between applications VM A 108 and/or VM B 110 with the host operating system 104 and/or the computer hardware 102 (presumably to execute computer instructions directly or indirectly on the computer hardware 102) should be interpreted to be in fact an interaction between the VMM and the host operating system 104 or the computer hardware 102 as appropriate.

Virtual Hard Drive

Figure 4A:
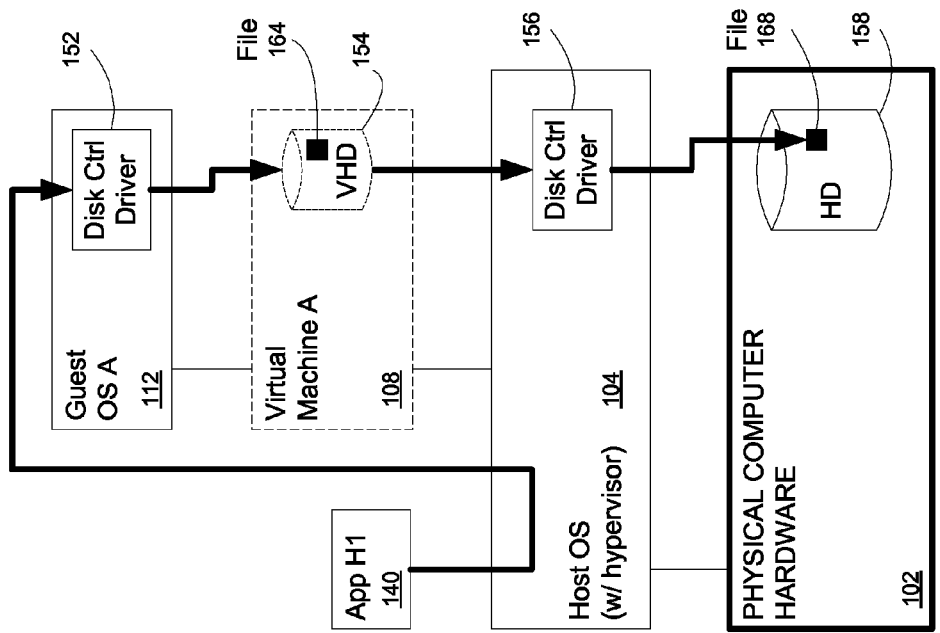
FIG. 4A illustrates an application executing on a guest operating system accessing a file on a virtual hard drive, said virtual hard drive corresponding to a file (or a plurality of files) on a physical hard drive.

As well-known and readily-appreciated by those of skill in the art, a virtual machine can expose one or more virtual disks to a guest operating system where data written to a virtual disk is actually stored and retrieved on demand in a back-end file on the real hard drive of the host computer system. For example, FIG. 4A—which is based on FIG. 3A for a host operating system 104 comprising a hypervisor component (not shown)—illustrates an application 116 executing on a guest operating system 112 and accessing a file 164 (a.k.a., a "virtual file") on a virtual hard drive 154 via a standard disk control driver 152. Of course, since the virtual hard drive 154 does not exist, the data for this virtual hard drive 154 as a whole is stored by the hypervisor of the host operating system 104 (via a standard disk control driver 156) as an actual file (or plurality of files) 168 on a physical hard drive 158 comprising part of the physical computer hardware 102.

Figure 4B:
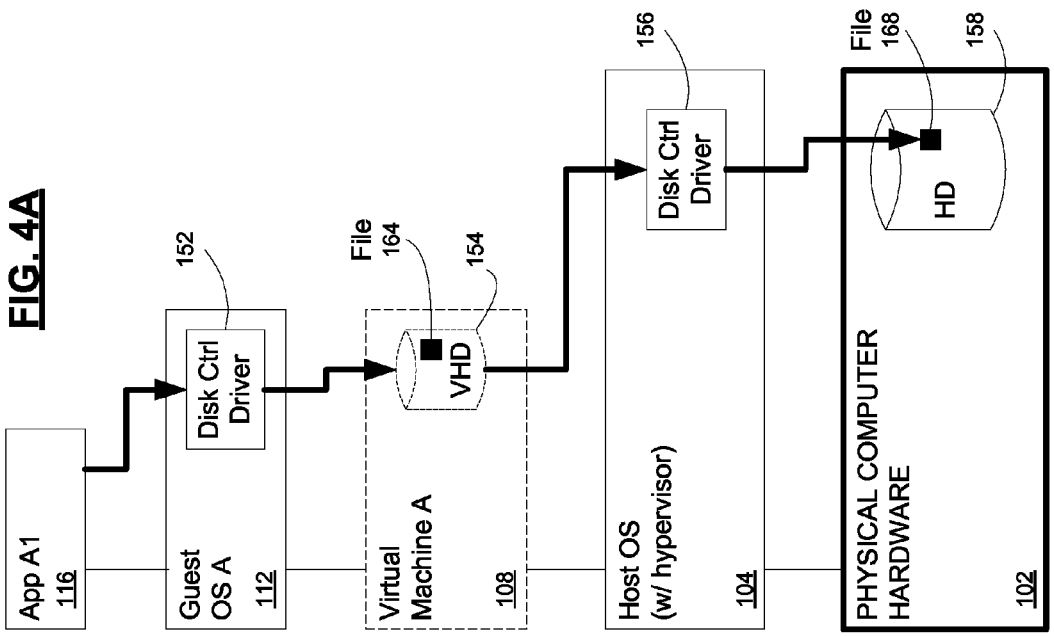
FIG. 4B illustrates an application executing on the host operating system accessing a file on a virtual hard drive via the guest operating system, said virtual hard drive comprising a file (or a plurality of files) on a physical hard drive.

It is also well-known and readily-appreciated by those of skill in the art that virtual disks are not accessible to the host operating system without running the guest operating system inside the virtual machine. For example, for an application executing on the host operating system—and as illustrated in FIG. 4B—access to the virtual file 164 on the virtual hard drive 154 by the application 140 executing on the host operating system 104 has can only be achieved via the guest operating system 112 (and its associated disk control driver 152). Of course, the host operating system can directly access the file that comprises the virtual hard drive, but the host operating system does not understand the file contents, that is, recognize that the file represents a virtual hard drive.

Various embodiments of the present invention are directed to systems and methods for "attaching" a virtual hard drive to the physical computer hardware. For several embodiments of the present invention, this is achieved by implementing a specialized disk controller driver for the host operating system that is recognized by the host operating system as a disk controller driver but which in fact also emulates the virtual hard disk it is "attached" to. When the host operating system sends requests to read and write sectors from the virtual hard drive, the specialized driver (the "virtual hard drive controller driver") directly accesses and manipulates the back-end file mentioned above. Thus the virtual disk is "attached" and recognizable by the host operating system and can be manipulated thereby (and applications executing thereon).

As skilled artisans will appreciate, there are several approaches for implementing the virtual hard drive controller driver described herein. One such approach for simulating a hardware device is suggested by U.S. patent application Ser. No. 10/435,481 cross-referenced earlier herein.

Figure 5:
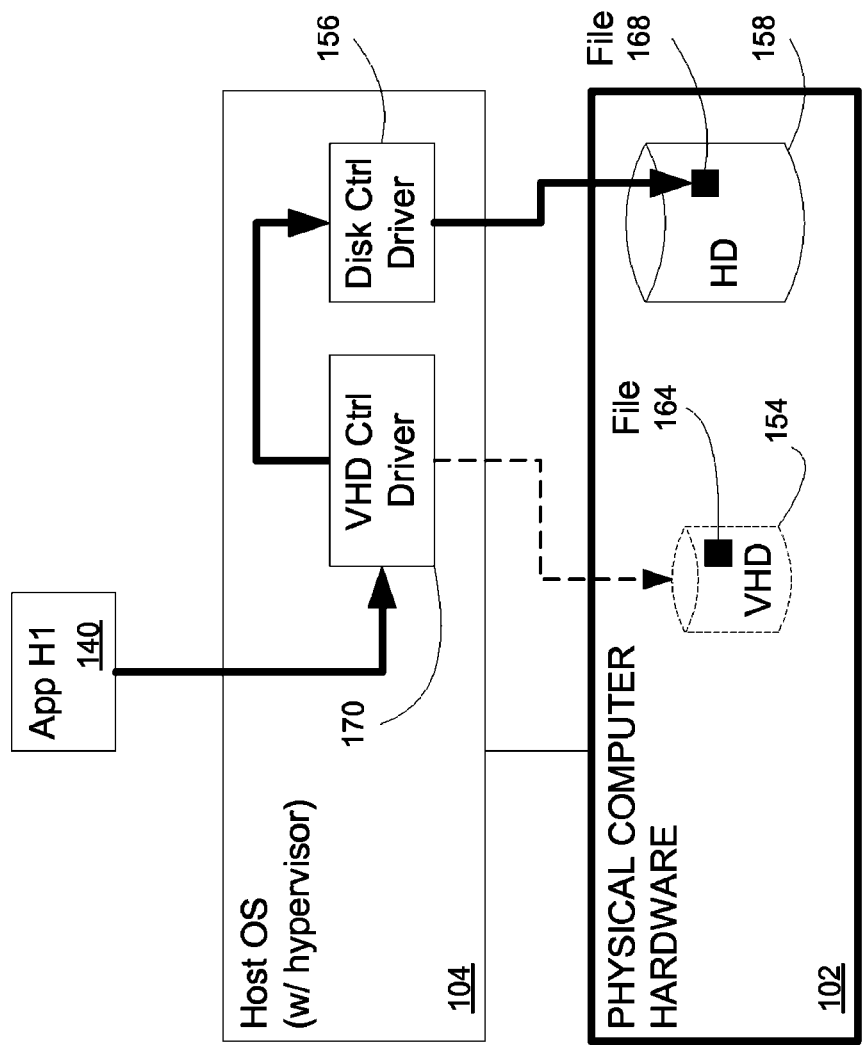
FIG. 5 illustrates one embodiment of the present invention for an application executing on the host operating system to access a file on a virtual hard drive via a virtual hard drive control driver in the host operating system and without loading the virtual machine or guest operating system for said virtual hard drive, said virtual hard drive comprising a file (or a plurality of files) on a physical hard drive.

FIG. 5 is an illustrative representation for several embodiments of the present invention. In this figure, an application 140 executing on the host operating system 104 accesses a file 164 (the virtual file) on a virtual hard drive 154 via a virtual hard drive controller driver 170 corresponding to said virtual hard drive 154. The virtual hard drive controller driver 170, in turn, accesses, via the standard disk controller driver 156 the file 168 on the physical hard drive 158 corresponding to the virtual hard drive 154.

Using this method, the application 140 can access the virtual file 164 without loading the virtual machine (not shown) or guest operating system (not shown). As a result, virtual files (such as file 164) on the virtual hard drive are readily accessible to the host operating system and (applications executing thereon) without the overhead costs (time, memory space, etc.) necessary to load the virtual machine and the guest operating system. This approach is also particularly useful in situations where it is desirable to access data on the virtual hard disk without loading the virtual machine or guest operating system or when the guest operating system fails to boot (perhaps due to a bad or corrupted virtual disk). For example, in the context of a virus, it may beneficial to patch the guest operating system (resident on the virtual hard drive)

without actually loading the guest operating system thereby eliminating the window of time the guest operating system might be vulnerable to attack. Likewise, this approach also allows viruses to be removed from the virtual hard drive while the VM and guest operating system are off-line. In this way, utilization of the present invention provides an end-user with an opportunity to access and fix the file-system of the virtual hard drive off-line when it is easier to do so than loading the virtual machine and guest operating system. And, of course, this approach also allows for the creation of virtual hard drives on the host computer system separate and distinct from use with a virtual machine.

Conclusion

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method for accessing a virtual file on a virtual hard drive comprising:
running a host operating system, the host operating system including a hard driver disk controller driver configured to control a physical hard drive;
storing, by the host operating system, an off-line virtual machine, wherein the off-line virtual machine includes a virtual hard drive that has a file system for the virtual machine stored therein and the virtual hard drive is stored as a virtual hard drive file on the physical hard drive;
running, by the host operating system, a virtual hard drive disk controller driver, wherein the virtual hard drive disk controller driver is configured to access the file system of the virtual machine stored in the virtual hard drive file;
receiving, from an application, a request to access a file stored in the virtual hard drive file;
emulating, by the host operating system via the hard drive disk controller driver, the virtual hard drive without loading the virtual machine, the virtual hard drive including the file; and
accessing, by the host operating system using the virtual hard drive disk controller driver, said file.

2. The method of claim 1, wherein accessing the file includes modifying code of a guest operating system stored in the virtual hard drive.

3. The method of claim 1, wherein accessing the file includes scanning the contents of the file for a computer virus.

4. The method of claim 1, wherein receiving from an application a request further comprises:
receiving a request from an application that is executed by a second virtual machine.

5. The method of claim 1, wherein receiving from an application a request further comprises:
receiving a request from an application executing on a remote computer system.

6. The method of claim 1, wherein said file comprises a plurality of files.

7. A computer system, comprising:
a processor coupled to a computer readable storage medium, the computer readable storage medium comprising:
instructions for controlling, by an emulation program, a first virtual machine;
instructions for storing a second virtual machine, wherein the second virtual machine is off-line and includes a virtual hard drive, wherein the virtual hard drive stores a file system for the second virtual machine, wherein the virtual hard drive is stored as a virtual hard drive file on a physical hard drive;

instructions for receiving, by the emulation program, a request to access a file in the file system of said virtual hard drive, the request received from the first virtual machine;

instructions for locating, by the emulation program, the file in the file system stored in the virtual hard drive file without the second virtual machine being loaded;

instructions for accessing, by the emulation program, the file on the physical hard drive without the second virtual machine being loaded; and instructions for sending, by the emulation program, the file to the first virtual machine without the second virtual machine being loaded.

8. The computer system of claim 7, wherein the request includes a request to access the file to perform a virus scan.

9. The computer system of claim 7, wherein the request includes a request to patch a guest operating system stored in the virtual hard drive file.

10. The computer system of claim 7, wherein said request includes a request to read said file.

11. The computer system of claim 7, wherein said request includes a request to write to said file.

12. The computer system of claim 7, wherein the emulation program includes a hypervisor.

13. The computer system of claim 7, wherein the emulation program is effectuated by a host operating system.

14. A computer readable storage medium including processor executable instructions, the computer readable storage medium comprising:

instructions for a virtual hard drive disk controller driver operable to execute in a host operating system, wherein the instructions for the virtual hard drive disk controller driver are configured to emulate a virtual hard drive for an off-line virtual machine without the virtual machine being loaded; and instructions for the virtual hard drive disk controller driver further configured to read/write to the virtual hard drive for the off-line virtual machine without the virtual machine being loaded.

15. The computer readable storage medium of claim 14, wherein emulating the virtual hard drive includes emulating the virtual hard drive without executing a virtual processor associated with the virtual machine.

16. The computer readable storage medium of claim 14, wherein emulating the virtual hard drive includes emulating the virtual hard drive without executing a guest operating system configured to run in the virtual machine.

17. The computer readable storage medium of claim 14, further comprising:

instructions for receiving a request to access the file from a second virtual machine.

18. The computer readable storage medium of claim 14, further comprising:

instructions for receiving a request to access the file from a remote networked computer system.

19. The computer readable storage medium of claim 14, further comprising:

performing a virus scan on the contents of the virtual hard drive.

* * * * *